United States Patent [19]
Flory

[11] Patent Number: 5,016,026
[45] Date of Patent: May 14, 1991

[54] LOAD RECORDING ROPE THIMBLE

[76] Inventor: John F. Flory, 4 Tower La., Morristown, N.J., 07960

[21] Appl. No.: 344,997

[22] Filed: Apr. 28, 1989

[51] Int. Cl.⁵ .................. G01D 9/00; G01G 19/14
[52] U.S. Cl. ........................... 346/33 R; 346/9; 346/116; 346/117 R; 177/2; 177/147
[58] Field of Search .............. 346/33 R, 77 R, 9, 116, 346/117 R, 122; 177/2, 147

[56] References Cited
U.S. PATENT DOCUMENTS 3,430,250 2/1969 Prewitt ........................... 346/77 R
3,679,012 7/1972 Havcotte ........................... 177/147

Primary Examiner—Benjamin R. Fuller
Assistant Examiner—Gerald E. Preston

[57] ABSTRACT

A thimble (10) for the eye (4) of a rope (2) is provided with a sleeve (40) which receives the pin (32) of a shackle (30) and a bar (42) which attaches this sleeve to the inside wall of the thimble. The load in this beam is measured and recorded by means of a mechanical strain recording device (50) in which a scribe (56) on an arm (54) marks on a recording surface (52).

20 Claims, 3 Drawing Sheets

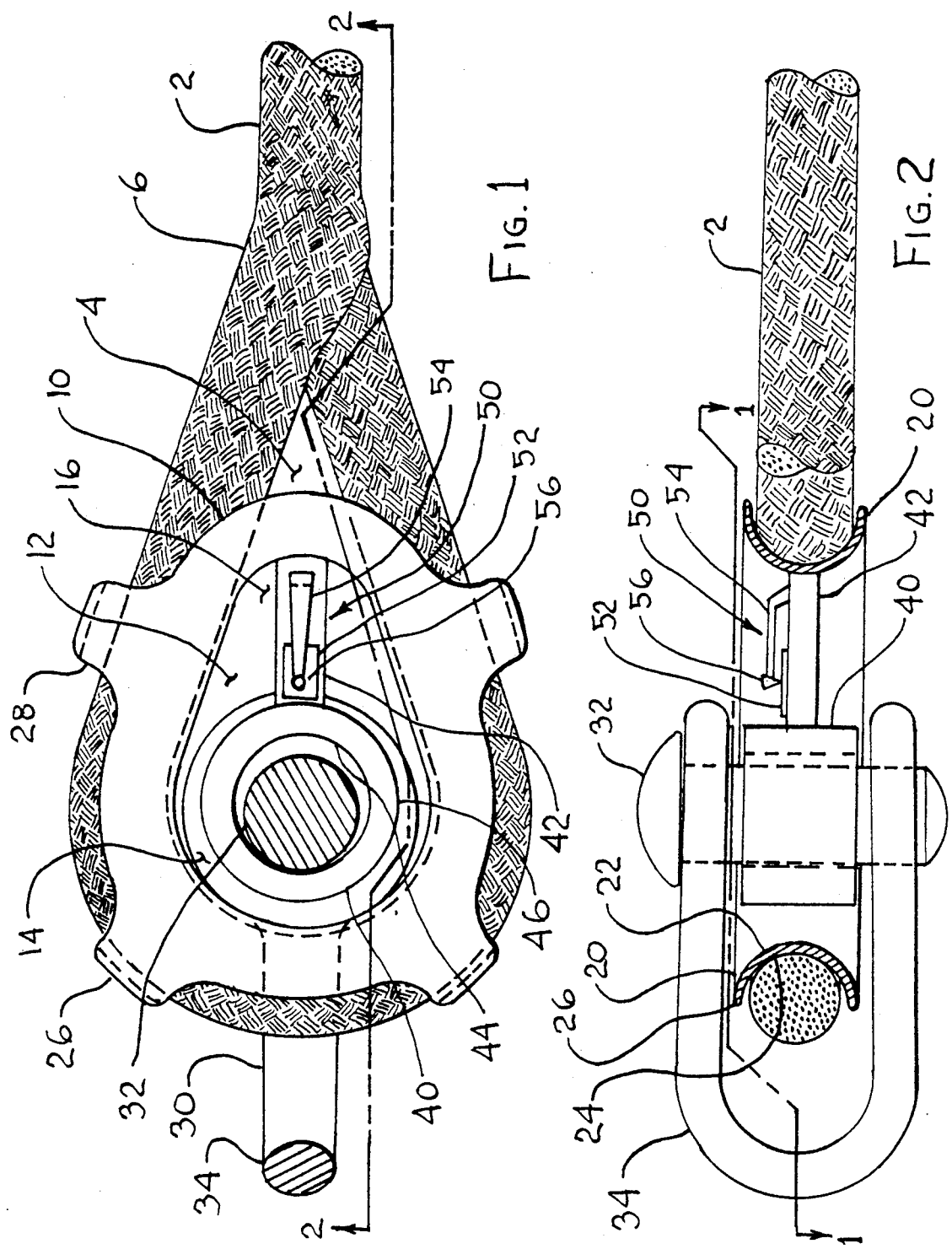

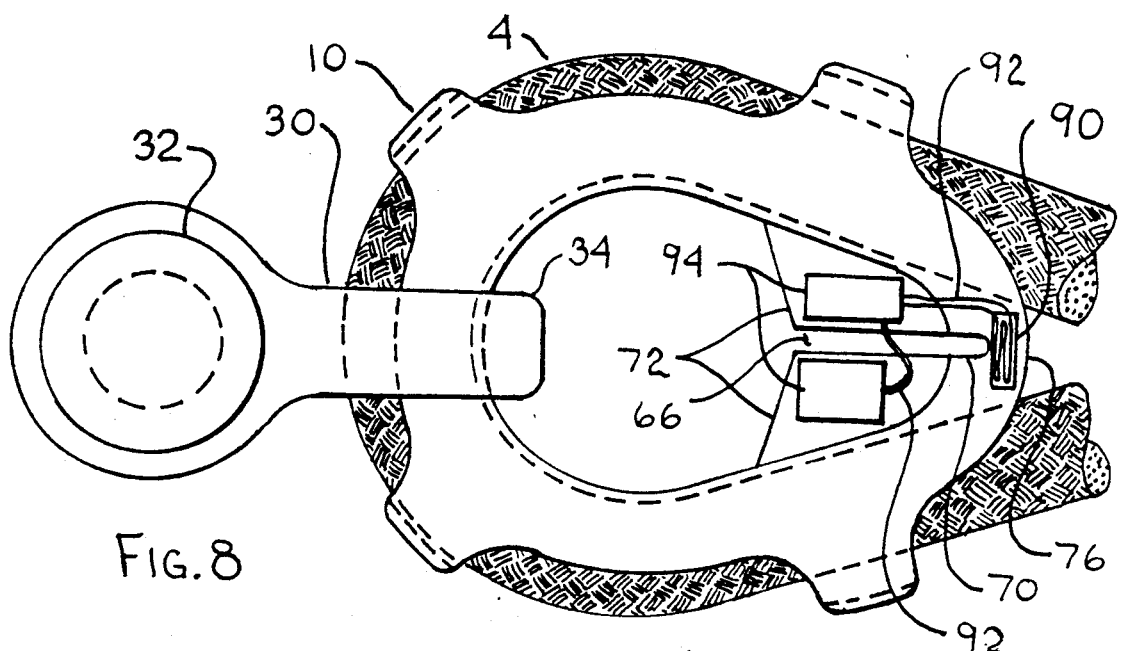
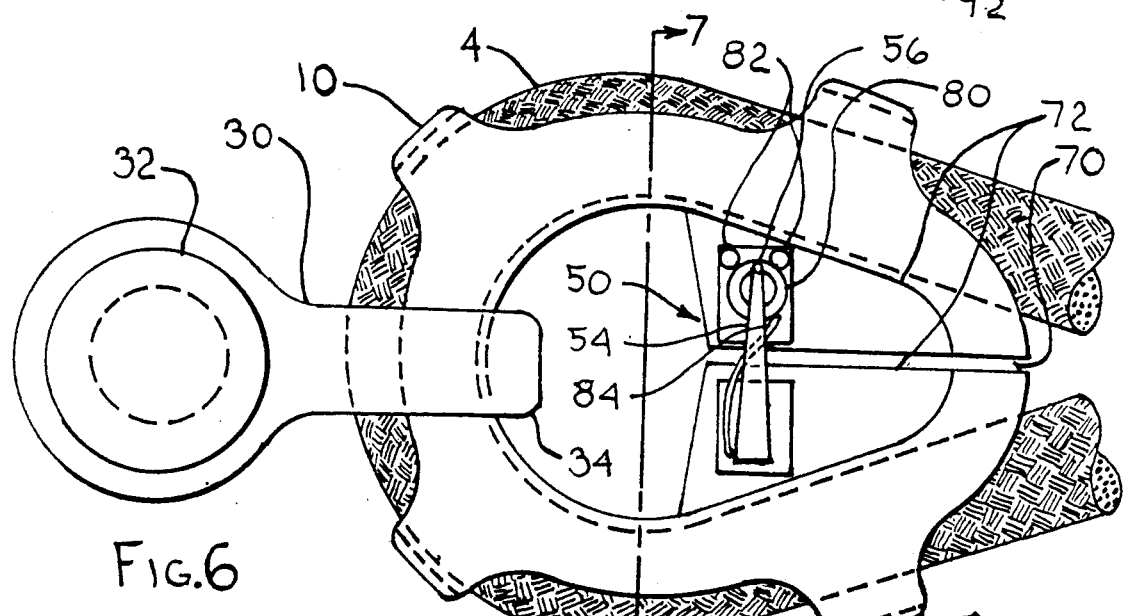
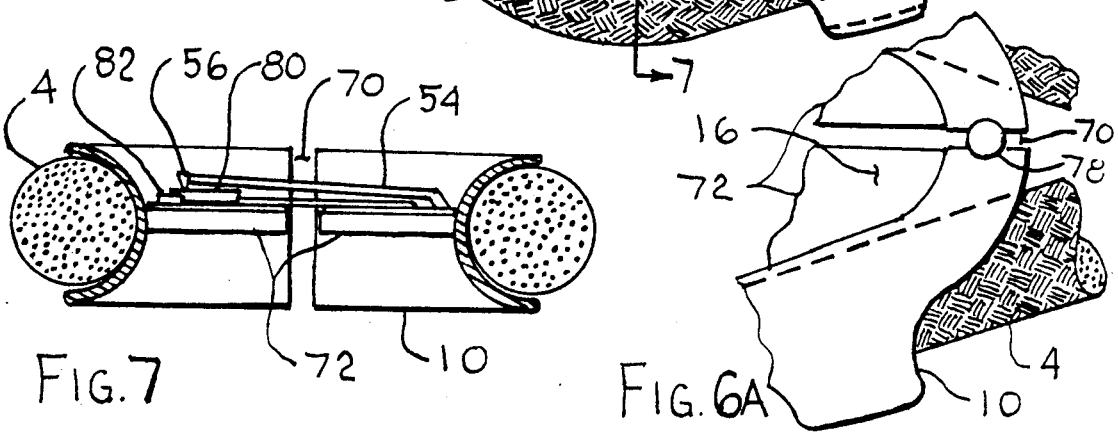

LOAD RECORDING ROPE THIMBLE

FIELD OF THE INVENTION

This invention relates to an improved thimble for the eye in the end of a fiber rope or other flexible tension member which produces a record of loads exerted on the tension member. The thimble comprises an annular body, a sleeve within this body for receiving a shackle or other load transferring element, a load carrying element connected to and separating apart the sleeve and the body, and a means of measuring the differential movement between said sleeve and said body cause by forces between said rope and said shackle. The device can be used to produce a permanent record of loads applied to the tension member for the purpose of determining load history and replacement criteria.

BACKGROUND OF THE INVENTION

Ropes are used in a variety of applications where it is desired to know the loading history, either the highest load or a complete record of each significant load to which the rope has been subjected. Marine mooring and towing are examples of such applications. The marine environment is especially severe, and conventional methods of measuring and recording rope loads are not generally satisfactory.

Electronic load measuring and recording devices incorporating stain gages or other electronic differential motion sensing elements, such as those disclosed by R. D. Karl in U.S. Pat. No. 3,956,742 and S. S. Fishfader in U.S. Pat. No. 4,283,942, have been proposed to record tensions in ropes in the marine environment. These utilize electronic strain gages which require supporting electronic signal driving, processing, and recording devices, as well as batteries to power this electronic equipment. Such electronic devices are costly to manufacture and difficult to install, operate, and maintain. Thus they are not generally suitable for prolonged service in a rough marine environment.

Mechanical scratch recording strain gages, such as that disclosed by R. H. Prewitt in U.S. Pat. No. 3,430,250, are rugged, can be made water resistant, and do not require electric power. These mechanical scratch strain gages are not as sensitive to strain and must be mounted on surfaces which undergo significant strain in order to obtain adequate reliable records.

Strain gage might be mounted directly on the rope thimble body. The surfaces of a thimble body which are highly strained and thus might be suitable for application of strain gages are also subjected to heavy pressure and abrasion, both by the rope and by connecting devices, which would destroy any strain gages mounted on these highly strained surfaces.

Other surfaces of the thimble body are not highly strained and are thus not suitable for strain measurement and recording. Mechanical strain recorders especially require larger relative differential motions than could be generated in those surfaces of a conventional thimble body which are remote from potential damage by the rope or the connection element.

This invention is a simple, inexpensive way of incorporating a differential motion sensing and load recording device into a rope thimble, such that it experiences sufficient differential motions to adequately respond to and record loads applied to the tension member, and yet it is positioned away from the rope and from connecting devices placed in the hole which might cause damage.

SUMMARY OF THE INVENTION

Brief Description of the Drawings

FIG. 1 is a top view of a rope thimble showing a shackle sleeve supported from the thimble body by a load carrying bar and with a load-recording mechanical strain gage mounted on the bar.

FIG. 2 is a section view through the thimble of FIG. 1 showing the sleeve, the bar, and the load-recording mechanical strain gage in more detail.

FIG. 6 is a top view of a rope thimble with a slot cut in the thimble body to increase the deflection between the sides of the thimble body and with a load-recording mechanical strain gage mounted across the thimble opening to measure this deflection FIG. 6A is an alternate view of part of the load recording thimble of FIG. 6 showing a pivot bar placed in the slot to limit closure of the slot but to permit relative rotation of the sides of the slot, thus still permitting increased deflection between the sides of the thimble.

FIG. 7 is a section view through the thimble of FIG. 5 showing the arrangement of the load recording mechanical strain gage in more detail FIG. 8 is a top view of a rope thimble with a slot cut part way through the thimble body, an electronic strain gage mounted on the thimble body adjacent to this slot, and associated electronic recording equipment mounted within the thimble body.

DETAILED DESCRIPTION OF THE INVENTION

Figure 3:
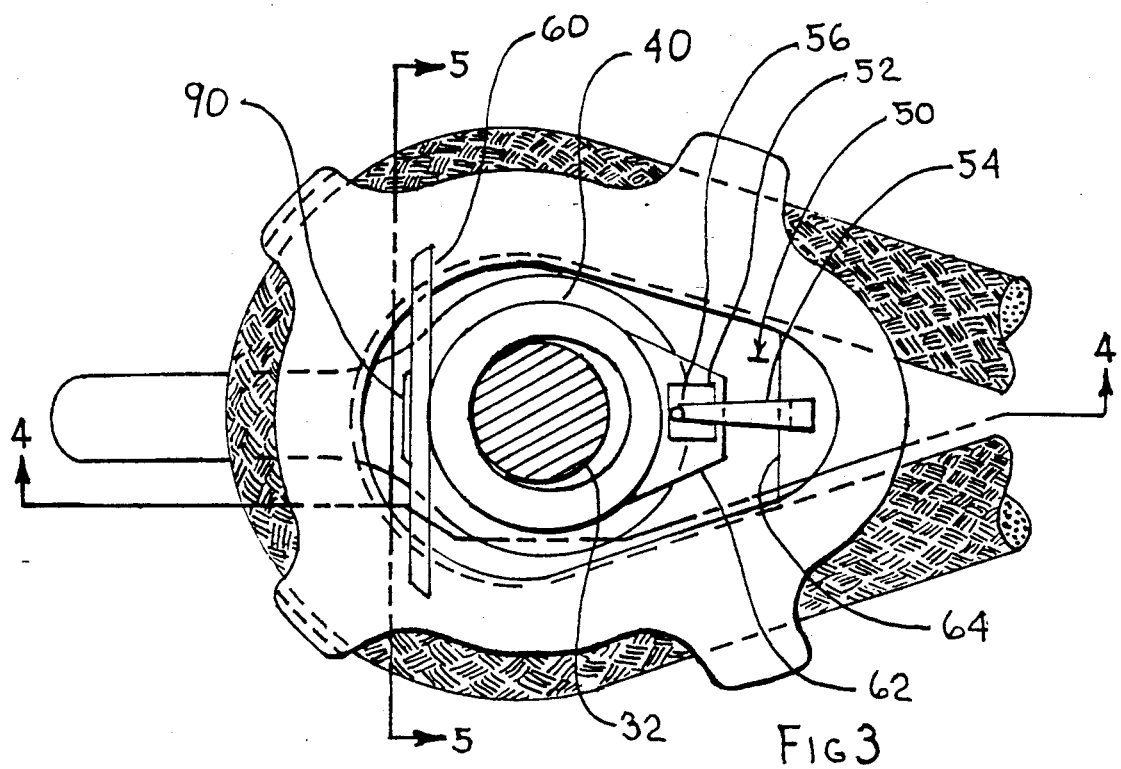
FIG. 3 is a top view of a rope thimble showing a shackle sleeve supported from the thimble body by springs and a load-recording mechanical strain gage independently mounted between the sleeve and the thimble body. This view also shows an electronic strain gage mounted on one of the springs.

Refer to FIGS. 1 and 2 which show a typical rope thimble with a load recording device of the type described herein.

The rope 2 has an eye 4 formed in its end by a splice 6. A rope thimble 10 is place in this eye. Thimbles are normally placed in rope eyes to maintain the shape of the eye and to protect the rope in the eye from damage.

The rope thimble 10 is of conventional design and shape. It is made of metal and formed in a shape to correspond to the shape of the rope eye 4. The inner portion of the thimble body forms an oblong shaped aperture or opening 12 with unequal radii at opposite ends. The large end 14 of the thimble body aperture faces the back of the eye, and the small end 16 faces the splice.

The body 20 of the thimble is shaped in a distorted semi-toroidal fashion around the thimble aperture 12. The outer portion of the toroidal shape is cut away, such that the thimble wall is essentially semi-circular in cross section. The wall around the larger end 14 forms a saddle-shaped surface surrounding the aperture. An inner peripheral wall 22 faces the thimble aperture 12.

The rope eye 4 lies within and rests against the other or outer peripheral wall 24. The inner and outer peripheral walls join at the sides to form thimble rims 26. The width of the thimble body between these rims is normally greater than the width of the rope. Several portions of the wall may form complete circles, called ears 28, which extend around the rope and serve to protect it.

The rope 2 is spliced in this thimble 10 in a conventional fashion. The tail (not shown) of the rope is placed around the thimble against the rope wall surface 24, in the vicinity of the large end 14 of the thimble, passing through the protective ears 28. The tail is brought back to rejoin the rope beyond the small end 16 to form an eye 4. A splice 6 is then formed in a manner appropriate for the particular rope design to join the tail back into the rope and complete the eye.

Normally the rope eye with thimble is joined to another rope, a chain, or a fastening point by a load transferring element such as a shackle 30. Either the shackle pin 32 or the shackle loop 34 passes through the thimble opening 12 and rests against the opening wall surface 22.

Electronic strain gages might be placed on the surfaces of the thimble body wall. The highly strained part of the thimble body is that portion around the large end 14 of the opening, against which the rope eye 4 and the shackle 30 bear. The walls 22 and 24 of this portion of thimble body would be obvious places to mount strain gages.

However the inner perpheral wall 22 is impacted and rubbed by the shackle, and any strain gage on this surface would soon be destroyed. The outer perpheral wall 24 is rubbed by the rope, and any strain gage on this surface would also soon be destroyed. Strain gages might be placed further forward in the thimble, on the wall surfaces along the sides or at the front or small end 16 of the thimble opening. Here the strain gages would be away from the shackle. However here also the strains due to rope loading are very small and would be difficult to measure with conventional strain gage techniques.

PREFERRED EMBODIMENT OF INVENTION

FIGS. 1 and 2 show the preferred embodiment. The rope 2, the thimble 10, the shackle 30, and their features have been explained above.

A sleeve 40 having an inner surface 44 forming an opening to receive the shackle pin 32 is placed inside the thimble aperture 12. The centerline of the sleeve may be essentially concentric with the centerline of the large end 14 of the aperture. The length of this sleeve is approximately the same as the width of the thimble, that is, the distance between the thimble rims 26.

The outer surface 46 of this sleeve is attached to the small end 16 of the aperture by a load carrying member or bar 42. A strain sensing and recording device 50 is mounted on this bar. A recording surface 52 is mounted near one end of the bar. This recording surface may be made of a soft metal such as brass. Near the other end of this bar is mounted an arm 54 which extends over the surface. A scribe 56 attached to this arm bears against the recording surface.

The scribe 56 and recording surface 52 are arranged in a manner such that any strain in the bar 42 causes a change in the distance between the attachment point of the arm and the position of the surface. This differential movement or strain thus causes the scribe to move across the recording surface, producing a mark. This mark on the recording surface serves as a permanent record of the magnitude of the strain.

The dimensions of the bar 42 are sized such that it is strong enough to withstand the highest load expected to be applied to the rope 2. However, the bar is thin enough that its differential movement over the length between the recording surface 52 and the attachment point of the arm 54 is sufficiently to make a discernable mark whenever a moderate load is applied to the rope. The magnitude of this mark is proportional to the strain in the bar and thus to the load applied to the rope.

The surface of the bar 42 is recessed below the rim 26 of the thimble body such that the strain gage 50 is protected from damage by the rope. The surface of the bar is remote from the shackle 30 and separated from it by the sleeve 40 such that the strain gage 50 is protected from damage by the shackle.

In the unlikely event that the bar 42 or its connections to the sleeve 40 or the thimble body 20 fail, the sleeve with the shackle pin 32 inside comes to rest against the back of the thimble body on the peripheral wall 22. The load can thus continue to be borne by the connection between the rope and the load transferring element.

ALTERNATIVE EMBODIMENT OF THE INVENTION

Figure 4:
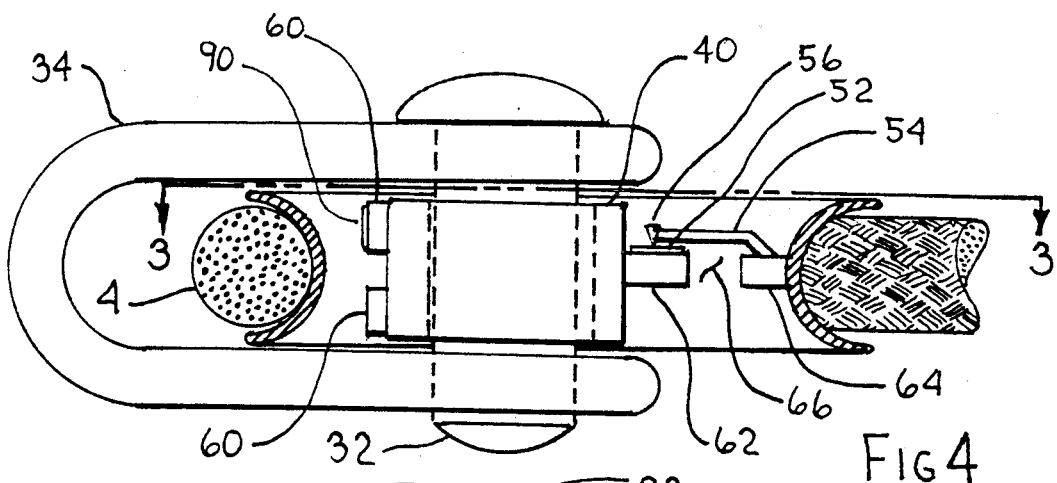
FIG. 4 is a section view through the thimble of FIG. 3 showing the sleeve, the springs, and the load recording mechanical strain gage in more detail.
Figure 5:
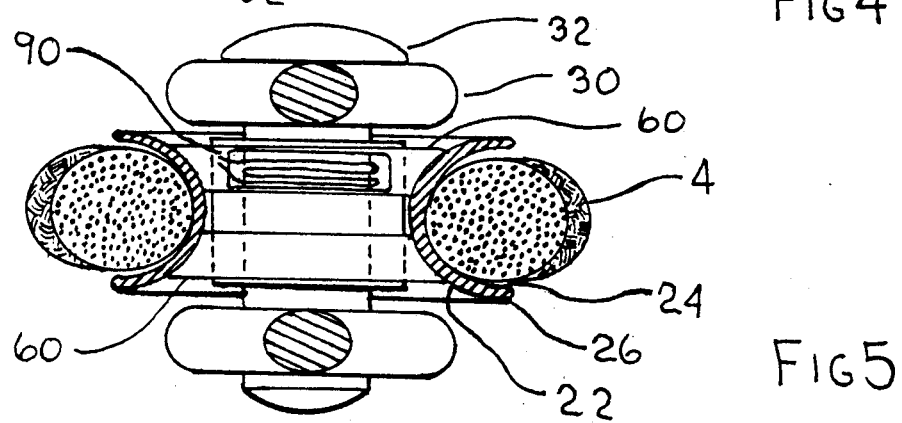
FIG. 5 is another section view through the thimble of FIG. 3 showing the sleeve, the springs, and the electronic strain gage in more detail.

FIGS. 3, 4, and 5 show an alternative arrangement. The sleeve 40 is again positioned near the center of the large end 14 of the thimble aperture 12. This sleeve is supported by spring beams 60 which are attached at their center to the sleeve and at their ends to the thimble body wall 22.

A web 62 extends from the outer surface 44 of the sleeve toward the small end 16 of the aperture. Another web 64 extends across the small end of the aperture in essentially the same plane as the sleeve web. The two webs are not directly connected, but are separated by a gap 66.

In this arrangement, the spring beams 60 deflect when tension is applied between the rope 2 and the shackle 30 or other load transferring element. This spring deflection causes relative movement between the thimble body 20 and the sleeve 40.

A strain recording device 50, similar to that described above, extends across the gap 66 between the sleeve web 62 and the thimble web 64. A recording surface 52 is mounted on the sleeve web 62. An arm 54 is attached to the sleeve web 64, and a scribe 56 on the end of this arm bears on the recording surface. Relative movements between the thimble body 20 and the sleeve 40 are recorded as marks made on the surface 52 by the scribe 56.

OTHER ALTERNATIVE EMBODIMENTS

The mechanical strain and load recording device 50, consisting of a recording surface 52 and a scribe 56, is simple, rugged, compact, and requires no source of power. As such it is well suited for use in a marine environment. Ideally it could be mounted directly on the thimble body 20. However, as mentioned above, the highly strained portion of the thimble body wall 22 is not suitable because it is contacted by the rope eye 4 and the shackle 30.

The thimble body can be modified to provide sufficient differential movements to enable recording by the mechanical strain gage. One form of such a modification is shown in FIGS. 6 and 7.

A slot 70 is cut in the thimble body 20 in the vicinity of the small end 16. This slot may extend completely though the thimble body. As this is a portion of the thimble body that is subjected only to low loads, the presence of the slot will not adversely effect the strength of the thimble body. Also, the rope is not in contact with the thimble body at the small end, and thus the slot will not adversely effect the rope.

The sides of the slot 70 will move together as the rope 2 is tensioned. This is caused by strains exerted by the tensioned rope eye 4 bearing against the outer perpheral wall 24 of the thimble body 20 around the large end 14 of the thimble aperture. Webs 72 are fastened to the inner peripheral wall 22 in the small end 16 of the thimble aperature on each side of the slot. A strain recording device 50 is fastened to these webs and extend across the gap 66 between these webs.

In the simple form of the mechanical strain and load recording device 50, described above, the recording surface 52 is stationary. The scribe 56 moves back and forth across the same position on this surface. The tension which the rope 2 has experienced is indicated by the length of the scratch made by the scribe on the surface. Only the maximum load is clearly recorded. This is sufficient for some purposes, where it is desired only to know the maximum load to which the rope has been subjected.

An alternative mechanical strain recording device may be used which employs means of moving the surface or the scribe such that the mark is made at a different position each time a strain is applied. Such a moving mechanical strain recording is illustrated in FIGS. 6 and 7.

In place of the stationary recording surface, a rotating circular recording surface 80 is guided by wheels 82. A ratchetting mechanism 84 causes this circular surface to rotate each time there is a differential movement between the scribe arm 54 and the circular surface. Each mark made by the scribe 56 is thus radially separated from the preceding mark. An example of such a device is the Record-A-Strain, manufactured by Eastlex Machine Corp., Lexington, Ky. and described in U.S. Pat. No. 3,430,250.

The circular surface 80 can be removed and taken to a laboratory for examination, and another surface can be mounted in its place. The height of each scribe mark is proportional to the magnitude of the rope tension which caused it. The total number of load cycles and the number of cycles exceeding given tensions can then be tabulated. This information can be used as a guide to determining the present strength of the used rope and its remaining service life.

It is not necessary that the slot 70 extend completely through the front of the thimble body. The slot can be made to extend only part way through the throat. It may extend from the small end 16 of the thimble aperature 12 toward the rope splice 6, leaving a small portion of material near the rims 26 as shown in FIG. 8. It may alternatively extend from the rims toward the thimble aperature, leaving a small bridge near the middle of the thimble body. Either way, the remaining bridge 76 across the thimble slot serves as a hinge. Alternatively, a bar 78 can be placed through the slot to serve as a pivot hinge, as shown in FIG. 6A.

This hinge or pivot arrangement only partially restrains relative motions between the sides of the thimble body. Although the sides of the slot are substantially constrained from moving together at the pivot, they can still rotate relative to each other. This rotational motion at the front or small end of the thimble body then still permits substantial relative differential motion to occur between the sides of the thimble body due to strain around the large end 16 of the thimble opening as the rope is tensioned. The differential motion is much less, but is still adequate to produce recordable deflections.

An electronic strain gage 90 can be mounted on the thimble slot bridge 76, as shown in FIG. 8. Although this electronic strain gage is shown for clarity on the inner perripheral wall 22 near the rim 26, it could alternatively be mounted on the outer perpheral wall 24. In that position it is not contacted by the eye 4 of the rope. It is remote from the shackle 30. It is also protected from other causes of external damage.

The electronic strain gage 90 would be connected through wires 92 to conventional electronic signal driving, conditioning, and recording devices 94. These devices which might be mounted within the thimble on the webs 72. The webs serve to protect the devices from the shackle 30. In this fashion, the electronic strain gage 90 and its associated equipment serve the same purpose as the mechanical load recording device 50.

The spring beams 60, shown in FIGS. 3 and 5, also provide a convenient and safe place to mount electronic strain gages. This alternative arrangement is shown in detail in FIG. 5. An electronic strain gage 90 is mounted on a spring beam 60 extending across the large end 14 of the thimble aperture. When mounted on the spring beam in this manner, the strain gage is protected from damage by the shackle 30. The beam is relatively highly strained, such that measurable and recordable signals are generated by a moderate load imposed on the rope 2.

Electronic strain gages could be substituted for the mechanical strain recording device in other embodiments of this invention. Also, a mechanical strain recording device such as those described above could alternatively be mounted on the spring beam in the manner of the electronic strain gage 90. In this arrangement, the sleeve 40 need not be completely circular, because it is not necessary to mount a strain recording device between it and the front of the thimble.

CONCLUSION

Several alternative means and methods of recording loads in ropes and other flexible tension members have been described above. All of these overcome the problems usually associated with measuring the strains in a rope thimble or similar end connection aperture in a flexible tension member.

The thimble is modified such that strain sensing and recording devices can conveniently be mounted away from the shackle or other connection device which might be placed in the hole and also away from the rope which is placed around the thimble. The strain sensing and recording devices are thus protected from damage. The thimble body is modified to produce substantial strain at such mounting locations so that adequate, reliable recordings are produced.

It will be obvious that electronic strain gages, with associated signal driving, processing, and recording devices, can be used in the positions described above for the mechanical strain recording devices. It will be obvious that mechanical strain recording devices can be mounted in the positions described above for the electronic strain gages. It will be obvious that other types of strain sensing and load recording devices can be used in these positions.

Other modifications can also obviously be made to the particular embodiments while remaining within the intended scope of the following claims. Thus the invention is limited only by the following claims.

What is claimed is:

1. An improved thimble adapted to be disposed within an eye at the end of a flexible tension member, said thimble comprising:

an annular body member, an outer peripheral wall on said body member for engaging said eye of said tension member, an inner peripheral wall on said body member defining an aperture for receiving a removable load transferring element, a sleeve member disposed within said aperture, an inner surface on said sleeve member for engaging said load transferring element, an outer surface on said sleeve member, a load carrying means disposed within said aperture, a first end of said load carrying means attached to said outer surface of said sleeve member, a second end on said load carrying means attached to said inner peripheral wall of said thimble, and means for recording differential motion between said sleeve member and said body member, whereby a record is produced of force between said tension member and said load transferring element.

2. The thimble of claim 1 wherein:

said body member has a width similar to or greater than the width of said tension member, said load carrying means has a thickness substantially less than the width of said body member at least one surface of said load carrying means is recessed within the width of said body member, and the differential motion recording means is operably attached to the recessed surface of said load carrying means, whereby the differential motion recording means is spaced away from said tension member and away from said load transferring means and is thus protected from damage thereto.

3. The thimble of claim 2 wherein said differential motion recording means comprise:

a recording surface operably attached to said recessed surface on said load carrying means, a recording arm operably attached to said recessed surface on said load carrying means and spaced from said attachment of said recording surface, and a scribe attached to said recording arm and bearing against said recording surface, whereby differential motions between the points of attachment to said load carrying member caused by force applied to said tension member by said load transferring means result in said scribe to mark on said recording surface.

4. The thimble of claim 1 wherein, the differential motion recording means comprise a recording surface operably attached either to said outer surface of said sleeve member or said inner peripheral wall of said body member, a recording arm operably attached to the other of said inner peripheral wall or said outer surface, and a scribe attached to said recording arm and bearing against said recording surface, whereby differential motions between said sleeve member and said body member caused by force applied to said tension member by said load transferring means result in said scribe to mark on said recording surface.

5. An improved thimble adapted to be disposed within an eye at the end of a flexible tension member, said thimble comprising:

an annular body member, an outer peripheral wall on said body member for engaging said eye of said tension member, an inner peripheral wall on said body member defining an aperture for receiving a load transferring element, a slot in said body member spaced from that portion of said outer peripheral wall which engages said eye, and means operably attached to said body member for recording differential motion between opposite sides of said body member.

6. The thimble of claim 5 wherein the differential motion recording means comprise:

a recording surface operably attached to a peripheral wall of said body member on one side of said body member, a recording arm operably attached to a peripheral wall of said body member on the opposite side of said body member and extending over said recording surface, and a scribe attached to said recording arm and bearing against said recording surface, whereby differential motions between said sides of said body member caused by force applied to said tension member by said load transferring means result in said scribe to mark on said recording surface.

7. The thimble of claim 5 further comprising:

pivot means disposed within said slot, whereby the sides of said slot are permitted to substantially rotate relative to each other but are prevented from substantially moving toward each other at said pivot means.

8. The thimble of claim 7 wherein the differential motion recording means comprise:

a recording surface operably attached to a peripheral wall of said thimble on one side of said body member, a recording arm operably attached to a peripheral wall of said thimble on the opposite side of said body member and extending over said recording surface, and a scribe attached to said recording arm and bearing against said recording surface, whereby differential motions between said sides of said body member caused by force applied to said tension member by said load transferring means result in said scribe to mark on said recording surface.

9. The thimble of claim 5 further comprising:

bridge means disposed across said slot, said bridge means being substantially thinner than the width of said body member, and the differential motion recording means operably attached to said bridge means.

10. The thimble of claim 9 wherein said differential motion recording means comprise:

an electronic strain gage operably mounted on said bridge

11. An improved thimble adapted to be disposed within an eye at the end of a flexible tension member, said thimble comprising:

an annular body member, an outer peripheral wall for engaging said eye of said tension member, an inner peripheral wall defining an aperture for receiving a removable load transferring element, a sleeve located in said aperture, an inner surface on said sleeve for engaging said load transferring element, an outer surface on said sleeve member, a load carrying member disposed within said aperture, a first end of said load carrying member operably attached to said sleeve, a second end of said load carrying member operably attached to said body member, and a differential motion sensing means positioned between said body member and said sleeve.

12. The thimble of claim 11 wherein:

said load carrying member is capable of deforming in proportion to load, whereby differential motion occurs between said body member and said sleeve when force is exerted between said eye and said load transferring element.

13. The thimble of claim 12 wherein:

said differential motion sensing means detects the deformation of said load carrying member.

14. The thimble of claim 12 wherein:

said differential motion sensing means is operably connected to said load carrying means.

15. The thimble of claim 14 wherein said differential motion sensing means comprise:

an electronic strain gage.

16. An improved thimble adapted to be disposed within an eye at the end of a flexible tension member, said thimble comprising:

an annular body member, an outer peripheral wall for engaging said eye of said tension member, an inner peripheral wall defining an aperture for receiving a load transferring element, a slot in said body member spaced from those portions of said peripheral walls which directly engage said eye and said load transferring element, and differential motion sensing means operably connected with adjacent sides of said body member, whereby said differential motion is enhanced by the presence of said slot and said differential motion is an indicator of the force transferred between said eye and said load transferring element.

17. The thimble of claim 16 wherein said differential motion sensing means comprises:

a recording surface operably attached to a peripheral wall of said body member on one side of said body member, a recording arm operably attached to a peripheral wall of said body member on the opposite side of said body member and extending over said recording surface, and a scribe attached to said recording arm and bearing against said recording surface, whereby differential motions between said sides of said body member causes said scribe to mark on said recording surface.

18. The thimble of claim 16 wherein:

said differential motion sensing means is capable of deforming in proportion to load, said deformation of said differential motion sensor is proportional to force exerted between said eye and said load transferring element, and said differential motion sensing means is adapted to detect said deformation.

19. The thimble of claim 16 further comprising:

bridge means disposed across said slot, said bridge means being substantially thinner than the maximum width of said body member, and said differential motion sensing means operably attached to said bridge means.

20. The thimble of claim 19 wherein said differential motion sensing means comprise:

an electronic strain gage operably mounted on said bridge.

* * * * *